United States Patent Office 3,838,029
Patented Sept. 24, 1974

3,838,029
ISOMERIZATION OF VITAMIN A COMPOUNDS AND THEIR DERIVATIVES
Martin Fischer, Ellerstadt, Walter-Wielant Wiersdorff, Ludwigshafen, Axel Nuerrenbach, Gruenstadt, Dieter Horn, Heidelberg, and Franz Feichtmayr, Ludwigshafen, Germany, assignors to Badische Anilin- & Soda-Fabrik Aktiengesellschaft, Ludwigshafen (Rhine), Germany
No Drawing. Filed Mar. 6, 1973, Ser. No. 338,533
Claims priority, application Germany, Mar. 7, 1972, P 22 10 800.5
Int. Cl. C07g 13/00
U.S. Cl. 204—159    9 Claims

ABSTRACT OF THE DISCLOSURE

The invention relates to the isomerization of cis-vitamin A compounds and their derivatives into the all-trans isomers by the action of light on sensitizers in the presence of the cis-isomers.

---

The present invention relates to a new process for the photochemical conversion of cis-isomers of vitamin A and derivatives of the same into the all-trans form.

Synthetic vitamin A often contains a large proportion of cis-isomers, although this amount varies depending on the synthesis method employed. Since the physiological effectiveness of vitamin A increases with the content of all-trans isomers, it is desirable to decrease as much as possible the percentage of inactive cis-isomers by converting them into all-trans-vitamin A.

It is known that this isomerization can be carried out by means of heat, light and/or in the presence of isomerization catalysts. The method most commonly employed hitherto uses iodine as catalyst, either in the presence or in the absence of light (J. Amer. Chem. Soc., 78, 4662, 1956). A great disadvantage of this method is that the cis-compound used (for example 11-cis) yields not only the all-trans compound, but also a further cis-isomer (for example 13-cis) and moreover the physiologically inactive compounds of the retro-vitamin A series. Furthermore, all-trans-vitamin A and its derivatives obtained by iodine-catalyzed isomerization occasionally decompose in storage, particularly at temperatures of more than 35° C. because they are very sensitive to traces of hydrogen iodide which readily forms from residual amounts of iodine. The range of use of iodine-catalyzed isomerization of vitamin A compounds is not only restricted by the said disadvantages but also by the fact that 9-cis-vitamin A compounds (which occur as end products in certain syntheses) do not isomerize under the action of iodine (Kirk/Othmer, "Encyclopedia of Chemical Technology," second edition, 15, pp. 498 et seq.).

The action of light is of no advantage in iodine-catalyzed isomerization. It is true that in the absence of a catalyst a cis-trans isomerization is initiated by ultraviolet light, but dimerizations and solvolyses take place concurrently (Bull. Soc. Chim., France, 4639, 1968) so that yields of all-trans compound are low.

The present invention is based on a fundamentally new process in which the sensitive vitamin is not exposed either to the attack of a reactive catalyst or to direct excitation of its electron system by ultraviolet light. The process consists in irradiating, with light having a wavelength of at least 350 nm., an organic compound or a mixture of at least two organic compounds to be regarded as a sensitizer which absorbs light of a wavelength more than 350 nm. and in which the energy difference between ionization energy and light excitation energy amounts to a maximum of 6 ev., in the presence of a cis-vitamin A compound or a derivative thereof which is present in liquid or dissolved form.

In the following description a vitamin A compound includes vitamin A itself or a derivative of the same. Examples of derivatives of vitamin A are the esters such as the acetate, propionate or palmitate, vitamin A acid or its esters such as the ethyl or isopropyl ester, or its amides such as monoethylamide or diethylamide, and vitamin A aldehyde. Vitamin A compounds and their derivatives are accordingly compounds whose essential molecule constituent is the $C_{20}$-skeleton of vitamin A.

The ionization energy of an organic compound suitable as a sensitizer may be determined from the reversible anodic or cathodic half wave potentials measured in butyronitrile or dimethylformamide according to rules described in the technical literature for example in A. Streitwieser, Jr., "Molecular Orbital Theory for Organic Chemists," John Wiley and Sons, New York, and London, pp. 173 et seq., 1961. Light excitation energy may be read off direct from the electron spectrum.

The speed of the desired transformation from cis to trans form increases with a decreasing energy difference between the ionization energy and light excitation energy of the sensitizer used. For example, isomerization takes place three times more rapidly with zinc tetraphenylporphin ($D=4.49$ e.v.) than with cobalt tetraphenylporphin ($D=4.82$ e.v.).

To achieve a particularly high reaction speed it is therefore advantageous to use a sensitizer with which the difference $D$ is not more than 4.75 e.v. Sensitizers having higher $D$ values than 6 e.v. may still initiate isomerization of vitamin A compounds but they are not of practical use because the reaction speeds are too low.

Since the process herein described for the isomerization of vitamin A compounds is easy to carry out experimentally it is possible to investigate an organic compound whose ionization potential is not known in a simple test as described in the examples below. Such a small scale test may be carried out easily by irradiating the organic compound to be tested for suitability in the presence of a cis-isomeric vitamin A compound and following the isomer composition for example by thin layer chromatography.

In order to avoid any irradiation of the sensitive polyene in addition to the desired light excitation of the sensitizer it is preferable to use sensitizers whose electron spectrum permits a selective excitation in the presence of the vitamin A compound used, i.e. mainly substances which absorb light having a wavelength of more than 350 nm.

The irradiation of the light in the absorption bands of the sensitizer takes place selectively, if desired in a conventional way using filter solutions or glass filters which can exclude direct injurious irradiation of the vitamin A compound.

It has been found that suitable sensitizers include particularly colored and/or fluorescent compounds such as 2,4,6-triphenylpyrylium perchlorate, 2,4,6-triphenylpyrylium picrate, 2,4,6-triphenylpyrylium chloroferrate, 2,4,6-tri-(p-dimethylaminophenyl)-pyrylium perchlorate, 2,6-diphenyl-4-(p-dimethylaminophenyl)-pyrylium chloride, perylene, quinizarine, β-quinophthalene, fluoresceine, eosine, Rose bengale, erythrosine, euchrysine orange, rhodamine B and other rhodamines, diethylsafranine, astraphloxine, pseudoisocyanine and other cyanines, quinoline red, Basacryl brilliant red, malachite green, methylene blue, crystal violet, 1,8-dihydroxy-4,5-diaminobromoanthraquinone, β-carotene, tetraphenylporphin and its metal complexes with magnesium, zinc, tin, nickel, copper and cobalt, tetra-(p-methoxyphenyl)-porphin and its metal complexes, chlorophyll, hematoporphyrin and mixtures of two or more sensitizers.

The amount of sensitizer which it is advantageous to use may be determined according to Lambert-Beer's law in dependence on the position and intensity of the absorption bands. The amount is generally from 0.001 to 10% by weight based on the vitamin A compound.

Preferred solvents are all those which behave inertly under the isomerization conditions toward the vitamin A compounds and the sensitizers and which dissolve the vitamin A compounds and the sensitizers at least partially. Such solvents include particularly hydrocarbons which are liquid at room temperature such as pentane, hexane, heptane, octane, petroleum ether, cyclohexane and benzene and also alcohols such as methanol, ethanol, and isopropanol, chlorinated hydrocarbons such as chloroform and carbon tetrachloride, ethers such as diethyl ether, and ketones such as acetone, acetonitrile, dimethylformamide and dimethyl sulfoxide. Mixtures of two or more solvents are also suitable. Examples of advantageous mixtures of solvents are mixtures of acetone and isopropanol and of ethanol and benzene.

Particularly for the isomerization to crystalline vitamin A compounds it is especially advantageous to carry out isomerization in a solvent, for example isopropanol, acetone, heptane or mixtures of the same in which the all-trans-vitamin A compound is less soluble than the cis-isomers and from which it therefore crystallizes during or after irradiation.

Any concentration of vitamin A compound may be employed; it is, however, preferable to use from 10 to 60% solutions in the solvent used. Photoisomerization may however be carried out without any solvent if the starting material is in liquid or oily form.

The method by which the sensitizer is separated depends on its physical properties, particularly its solubility in various solvents. Sensitizers which are soluble in water may be extracted for example from solvents which are not miscible with water by means of water or a mixture of water and methanol. Sensitizers which are insoluble in certain solvents may be separated by extraction of the vitamin A compound with an organic solvent. When small concentrations of sensitizer are sufficient for photoisomerization, the all-trans-vitamin A compound may be crystallized out direct, the sensitizer remaining in the mother liquor.

To dispense with separation of the sensitizer from the vitamin A compound photoisomerization may also be carried out in heterogeneous phase. For this purpose the sensitizer is applied to a solid carrier material or embedded therein and the liquid vitamin or dissolved vitamin is caused to flow past the sensitizer with simultaneous irradiation. The carrier material, for example a powder, may also be suspended in the liquid or dissolved vitamin.

Any solid having adequate surface area may be used as carrier. The sensitizer should adhere to the carrier firmly enough for it not to be detached by the vitamin or vitamin solution during irradiation. It is preferred to use a carrier in the form of fibers, fabric, lamellae, granules, spheres, moldings or powders. Suitable materials for the carrier include organic polymers, for example a fabric of polyacrylonitrile dyed with Rhodamine B, and inorganic solids, preferably silica gel, aluminum oxide, ceramic material and glass.

Heterogeneous sensitization may be carried out in two liquid phases which have little or no miscibility with one another, the solvents for the formation of the two liquid phases being such that the vitamin A compound is exclusively or at least preferentially soluble in one phase and the sensitizer used is exclusively or preferentially soluble in the other phase. An oily vitamin A compound without added solvent may serve as one of the two phases.

A preferred embodiment of the process is as follows: A sensitizer which has little or no solubility in a solvent which has little or no miscibility with water, for example a hydrocarbon, a halohydrocarbon or an ether or a specific oily vitamin A compound is exposed, while mixing the two phases, to light in aqueous solution in the presence of a vitamin A compound which may be dissolved in a solvent having little or no miscibility with water of the type described above.

Any light source which emits light of a wavelength of from 300 to 1000 nm., i.e. approximately in the ultraviolet and/or visible and/or near infrared region, is suitable for the process of this invention. Good utilization of the light energy is achieved with a light source whose main emission lies in the range of the absorption bands of the sensitizer. Thus for example it is favorable in sensitizing with Rhodamine B (which has a strong absorption band in the region from 460 to 580 nm.) to use a high pressure mercury vapor lamp doped with thallium iodide which preferentially emits light of a wavelight of 535 nm. To protect the vitamin A compound from the direct action of light, short-wave radiation can be eliminated with a suitable filter. The filter should absorb or eliminate light up to at least about 350 nm. and up to a maximum of about 500 nm. When using a light source which emits predominantly monochromatic light, for example a sodium vapor lamp, a filter is not necessary.

Isomerization may be carried out at any temperature. To avoid thermal decomposition of the vitamin A compound it is convenient for the reaction temperature not to be higher than 80° C. A lower temperature limit is set by the viscosity or melting point of the solvent or mixture of solvents used. For reasons of economy, however, room temperature operation, i.e. at about from 15° to 30° C. (which does not involve any additional expense) is preferred, at atmospheric or slight superatmospheric pressure depending on the type of solvent used.

Photoisomerization is conveniently carried out while excluding air. For this purpose the reaction solution is gassed before or during exposure with an inert gas, for example argon, or, preferably, nitrogen for reasons of economy.

The process may be carried out continuously or batchwise. Optimum exposure times in the batchwise method or rate of flow in the continuous method depend on the intensity of the light source. Although excessive irradiation or residence times do not have any detrimental effect, it is convenient to use only such an amount of light energy that the absorbance of the vitamin A compound in question reaches a maximum at the wavelength characteristic for the all-trans isomer.

The yields of isolated crystalline all-trans-vitamin A acetate or other vitamin A derivative from the isomer mixture used are much higher in the process of the invention than in iodine-catalyzed isomerization. The product is devoid of impurities which could catalyze a decomposition, for example during storage or thermal treatment. In contrast to catalytic isomerization with iodine the process of the invention is also suitable for the conversion of 9-cis to all-trans-vitamin A compounds.

The following Examples illustrate the invention.

EXAMPLE 1

270 g. of a mixture of equal parts of all-trans- and 11-cis-vitamin A acetate and 110 mg. of zinc tetraphenylporphine is dissolved in 270 ml. of isopropanol and, while being gassed with nitrogen, is irradiated with a high pressure mercury vapor lamp doped with thallium using a 2% aqueous potassium chromate filter. As soon as absorption has reached a maximum at 328 nm. (after about thirty minutes) the lamp is switched off and crystallization is allowed to take place at −20° C. The yield of crystalline all-trans-vitamin A acetate is 72%. The mother liquor may be immediately subjected to a further photoisomerization, another 18% of crystals being thus obtained.

Very similar yields of all-trans-vitamin A acetate are obtained at about the same exposure period with chlorophyll, hematoprophyrine, Rose bengale or erythrosine as sensitizers.

The yields are much less however in prior art methods, as the repetition, mutatis mutandis, of U.S. Pat. 3,136,794 shows:

100 g. of the mixture of isomeric vitamin A acetates used in Example 1 is dissolved in 700 ml. of hexane and cooled to 0° to 5° C.; a solution of 100 mg. of iodine in 300 ml. of hexane is then added. The temperature is allowed to rise within an hour to 20° to 25° C., 1 g. of sodium boron hydride is added while strring and fifteen minutes later 10 ml. of methanol is added. After forty-five minutes the whole is extracted four times, each time with 200 ml. of a mixture of methanol and water in the ratio 4:1, the hexane phase is evaporated and recrystallized from 110 ml. of isopropanol at −20° C. 28 g. (28%) of all-trans-vitamin A acetate is obtained.

EXAMPLE 2

200 mg. of 11-cis-vitamin A palmitate and 0.7 mg. of zinc tetraphenylporphine in 3.5 ml. of acetone are irradias in Example 1. An equilibrium of 90% of all-trans, 7% of 9-cis and 3% of 13-cis isomers is thus set up. The experiment is repeated with 11-cis-vitamin A alcohol, 11-cis-vitamin A aldehyde and 11-cis-vitamin A acid ethyl ester and the results are comparable.

EXAMPLE 3

A seriously contaminated mixture of vitamin A acetate isomers, in which the proportion of 9-cis isomer has been enriched to 46%, is irradiated as described in Example 1, using zinc tetraphenylporphine as sensitizer until the 9-cis content has fallen to 20% and the trans content has accordingly risen from 23 to 49%. 35% of all-trans-vitamin A acetate is obtained by crystallization.

EXAMPLE 4

A contaminated vitamin A acetate mixture which contains as main components about equal parts of the 11-cis and all-trans isomers is mixed with such an amount of isopropanol with an addition of 0.4% of zinc tetraphenylprophine that a 50% solution is formed. The solution is allowed to flow continuously at a rate of 8 liters per hour through an exposure appartus equipped with a 2 kilowatt high pressure mercury vapor submerged lamp doped with thallium iodide. The vitamin is protected from shortwave radiation by a 2% aqueous potassium chromate solution and is circulated in the apparatus with a pump. Processing by crystallization gives 55% of all-trans-vitamin A acetate.

EXAMPLE 5

Polyacrylonitrile fabric dyed with Rhodamine B is wrapped round the cooler of the lamp described in Example 1. The cooler is dipped into a solution of 100 g. of vitamin A acetate (cis/trans=1.0) in 300 ml. of isopropanol and is irradiated while circulating as described in Example 1. Then the whole is concentrated to half its volume. Crystallization at −20° C. gives 52% of all-trans-vitamin A acetate.

EXAMPLE 6

A submerged lamp apparatus fitted with a mercury vapor lamp doped with thallium iodide is filled with a solution of 0.16% of Basacryl Brilliant Red in water. While irradiating, a 50% solution of vitamin A acetate enriched with the 11-cis form in heptane is bubbled through a frit at the bottom of the irradiation vessel, the organic phase being recycled by means of an overflow and a pump. As soon as absorption of the vitamin solution has reached a maximum the lamp is switched off, the organic phase is evaporated and the residue is crystallized from isopropanol. 55% of crystalline all-trans-vitamin A acetate is thus obtained.

We claim:

1. A process for the isomerization of a cis-vitamin A compound or derivative thereof into the all-trans isomers wherein an organic compound or a mixture of at least two organic compounds employed as sensitizer and which absorbs light of a wavelength of more than 350 nm. and in which the energy difference between ionization energy and light excitation energy amounts to a maximum of 6 e.v. is irradiated with light having a wavelength of at least 350 nm. in the presence of a cis-vitamin A compound or a derivative thereof in liquid or dissolved form.

2. A process as claimed in claim 1 wherein the sensitizer is irradiated selectively in its absorption bands.

3. A process as claimed in claim 2 wherein direct radiation of the vitamin A compound is excluded by the use of a filter solution or a glass filter.

4. A process as claimed in claim 1 wherein isomerization is carried out in a solvent or mixture of solvents from which all-trans-vitamin A or a derivative thereof crystallizes out during or after irradiation.

5. A process as claimed in claim 1 wherein the sensitizer is applied to or embedded in a solid carrier material and used for isomerization in this form.

6. A process as claimed in claim 1 wherein the sensitizer and the vitamin A compound are present in two liquid phases which are immiscible or only partially miscible.

7. A process as claimed in claim 1 which is carried out continuously.

8. A process as claimed in claim 1 wherein isomerization is carried out with 11-cis-vitamin A or one of its derivatives or a mixture which contains 11-cis-vitamin A or one of its derivatives.

9. A process as claimed in claim 1 wherein isomerization is carried out with 9-cis-vitamin A or one of its derivatives or with a mixture which contains 9-cis-vitamin A or one of its derivatives.

References Cited

J. American Chemical Soc., vol. 78 (1956) p. 4662.

HOWARD S. WILLIAMS, Primary Examiner